Feb. 13, 1923.
E. SIEGEL.
VEHICLE LOCK.
FILED JULY 10, 1920.
1,445,456.
2 SHEETS—SHEET 1.
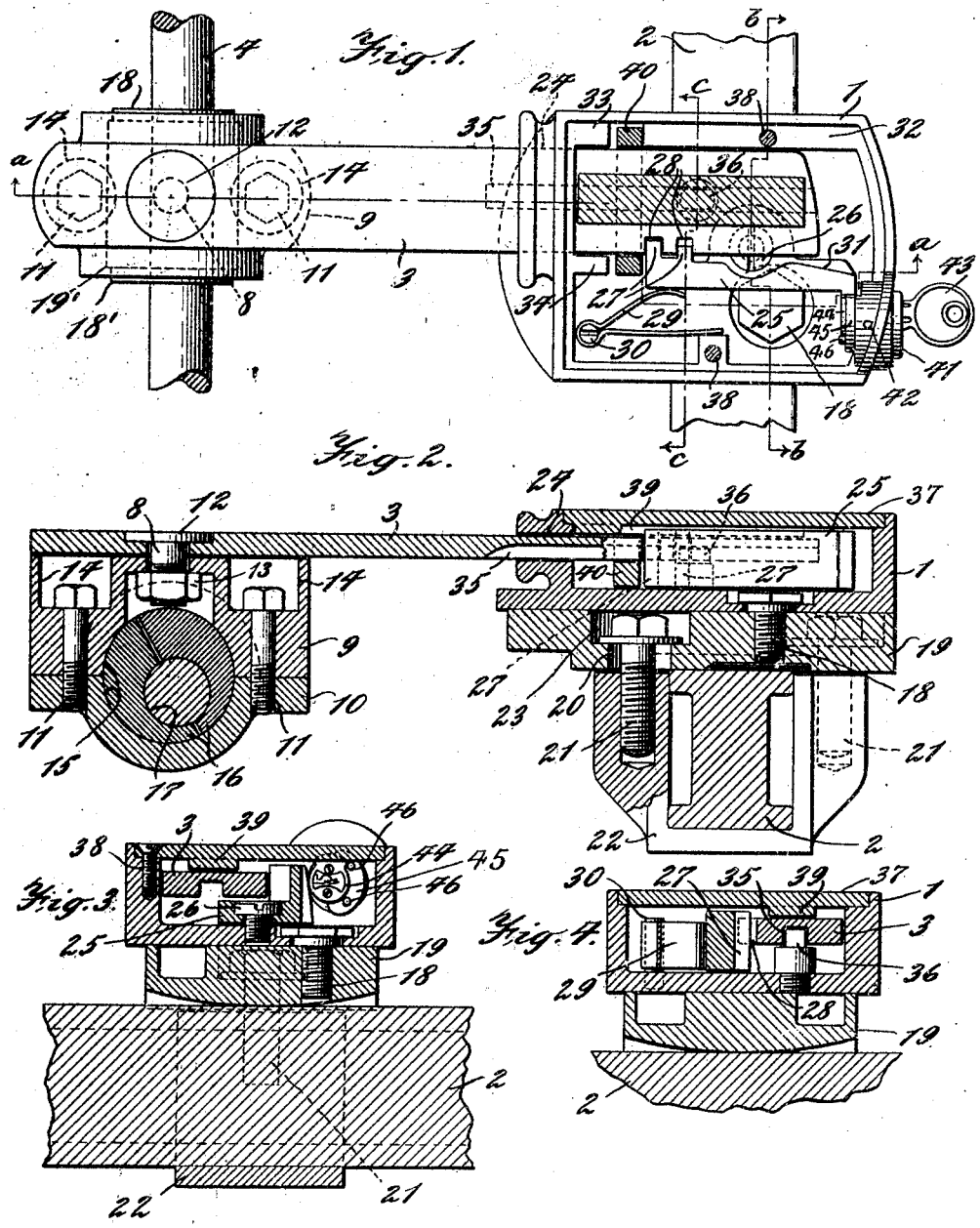
INVENTOR.
Ernst Siegel
BY
Rosenbaum, Stockbridge & Borst
ATTORNEYS.

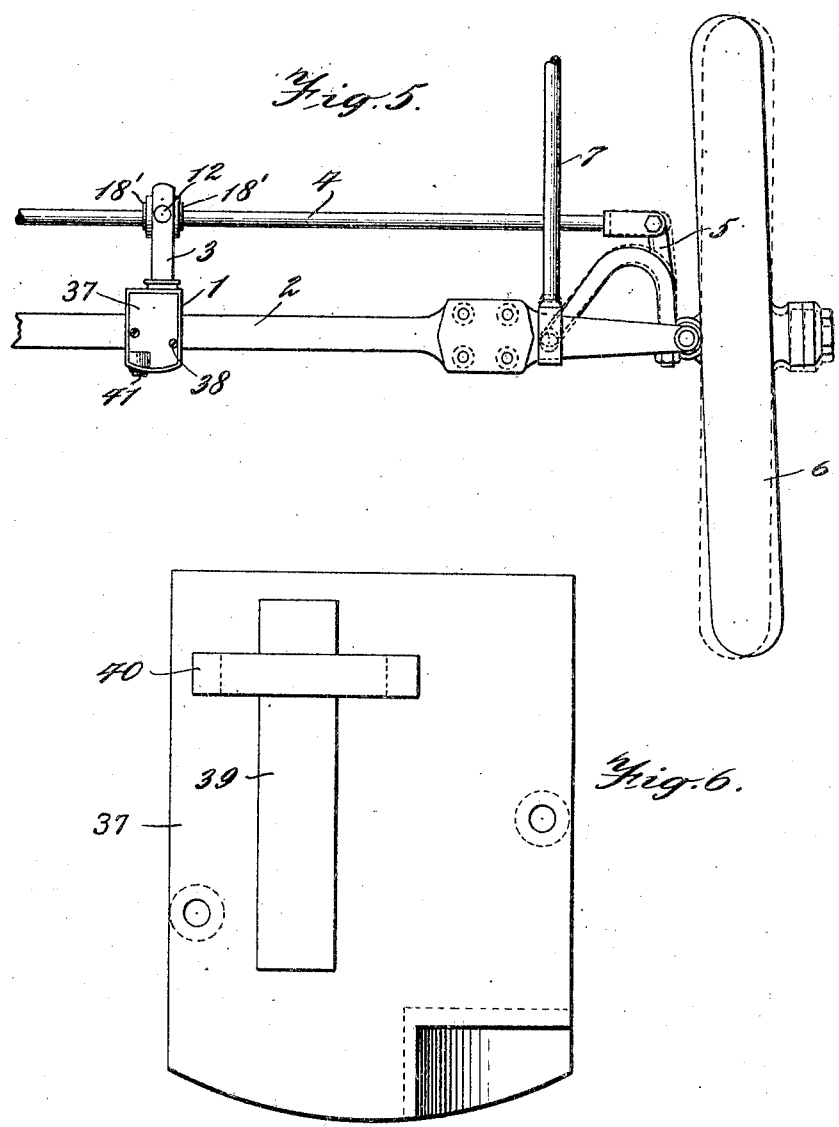

Patented Feb. 13, 1923.

1,445,456

UNITED STATES PATENT OFFICE.

ERNEST SIEGEL, OF NEW YORK, N. Y., ASSIGNOR TO THE AXLE LOCK CORPORATION, OF NEW YORK, N. Y., A CORPORATION OF NEW YORK.

VEHICLE LOCK.

Application filed July 10, 1920. Serial No. 395,210.

*To all whom it may concern:*

Be it known that I, ERNEST SIEGEL, a citizen of the United States, residing at New York, in the county of New York and State of New York, have invented certain new and useful Improvements in Vehicle Locks, of which the following is a full, clear, and exact description.

This invention relates to locking devices for vehicles for the purpose of preventing their theft or unauthorized use. An objection to prior devices has been that they did not conform to the fire laws of many localities which require that a vehicle must not be left standing upon the streets in such a condition that it cannot be moved a certain distance, such as 200 feet, for example, if the necessity arises. Other objections have been upon the ground that the locks were either too cumbersome and expensive, or else could easily be tampered with and quickly rendered ineffective by the thief.

An object of my invention is to provide an improved lock for vehicles which will comply with the fire laws of various localities by permitting movement of the vehicle for a short distance, but which will prevent operation of the vehicle through any considerable distance from the place in which it has been left in a locked condition.

A further object is to provide a lock for vehicles which, when in the locked condition, will conceal and protect the means of attachment to the vehicle against removal of the lock from the vehicle by ordinarily available tools and only with the greatest difficulty and delay with any tools.

A further object is to provide a lock for vehicles, which is sufficiently strong and sturdy as to prevent disablement of the lock by blows, and which when locked will conceal the operative locking mechanism and prevent tampering therewith or its disablement.

A further object is to provide a lock for vehicles which can not be accidentally shifted from the unlocked to the locked condition.

A further object is to provide a lock for vehicles which is adjustable to fit any of the common makes of machines, and which is simple in construction, durable in use, and inexpensive to manufacture.

Other objects and advantages will be apparent from the following description and the novel features of my invention will be particularly pointed out in claims.

I prefer to apply my improved lock to the vehicle between the front axle and the cross steering rod and lock the front wheels in a position at a slight angle to their normal forward driving position so that if necessary, the vehicle can be moved a short distance before striking the curb. I pivotally secure a bar to one of the parts such as the cross steering rod and upon the other part such as the axle, I pivot a casing. The pivoted bar is adapted to normally oscillate with and reciprocate with the casing at one side of the pivot of the same, as the cross steering rod moves toward one side or the other as necessary to steer the vehicle. I provide suitable locking means, such as a locking pawl within the casing, for engaging with and locking the bar against reciprocation therein, and also means for rendering the pawl effective or ineffective at will. The invention also consists in certain details of construction and arrangement as will hereinafter be pointed out more fully.

In the drawings:

Fig. 1 is a plan of a lock constructed in accordance with my invention, a portion of the cover of the pivoted casing having been removed to show the interior thereof;

Fig. 2 is a section of the same taken substantially along the line *a—a* of Fig. 1;

Fig. 3 is a section of the same taken substantially along the line *b—b* of Fig. 1;

Fig. 4 is a section of the same taken substantially along the line *c—c* of Fig. 1;

Fig. 5 is a plan of a portion of a vehicle showing clearly the manner of application of my invention thereto, the locked position of the wheel being shown in full lines and the normal straight running position of the wheel being indicated by the dotted lines; and Fig. 6 is a plan of the inner face of the cover of the pivoted casing.

In the illustrated embodiment I pivotally secure a casing 1 to the front axle 2 of a vehicle and reciprocating in the casing at one side of the pivot is a locking bar 3 which is pivotally secured to the cross connecting or steering rod 4 by means of which the steering knuckles 5 of wheels 6 (only one of which knuckles and wheels is shown) are caused to move in unison whenever one of them is shifted by the rod 7, under the control of the steering wheel (not shown).

The bar 3 is pivoted by a bolt 8 to the flat top of the upper section 9 of a collar, the other section 10 of which is secured to the section 9 by the cap screws 11. The bolt 8 is provided with a round head 12 which is countersunk into the upper face of the bar 3, and with a nut 13 which is disposed within a cavity in the under face of the upper section 9 of the collar. The heads of the cap screws 11 are received within depressions or cavities 14 in the flat upper face of the section 9 and the shanks or stems of the screws are threaded into the lower section 10 and hold the sections together. The sections in their abutting faces are provided with semi-cylindrical cavities 15 co-operating to form together a circular transverse bearing through which the cross steering rod passes. A split bushing 16 is rotatably carried within the bearing of the collar and has a longitudinally extending, eccentrically disposed, bearing aperture 17 for gripping the rod 4. The bushing 16 has slightly reduced end portions 18' which receive flange rings 19' projecting inwardly from the cavities 15. Thus when the bushing 16 is rotated about the rod 4 it will move eccentrically and correspondingly displace in a rotary direction the collar formed by sections 9 and 10. When the cap screws 11 are tightened, the sections 9 and 10 will be brought toward one another and grip the split bushing 16. The split bushing will in turn be made to grip the rod 4 and be very tightly clamped thereto, so that the collar and bushings are held securely against movement along the rod 4. The reduced ends 18' and flange rings 19' prevent disablement of the lock by driving the bushing endwise out of the collar. The heads of the screws 11 are accessible only from the cavities 14 in the upper face of section 9, and the bar 3 is wide enough and extended sufficiently to cover the cavities 14 when said bar is disposed substantially transversely of the rod 4, so that the collar can only be unclamped from the rod 4, by first swinging the bar 3 to a position substantially parallel with the rod 4 and thus uncover the cavities 14. The bar 3 can only be removed from the collar by first separating the sections 9 and 10 so as to provide access to nut 13.

A cap screw 18 has its head countersunk in one side portion of the bottom wall of the casing 1, passes through the same and is threaded into a plate 19 to form a pivot for the casing and to secure the casing thereto. The plate 19 rests upon the upper face of the front axle 2 and is provided with similarly extending elongated apertures 20 therein, through which pass cap screws 21 that thread into the upper ends of the arms of the U-shaped clamp member 22 which embraces the axle 2 from the lower side. The heads of the screws 21 are received entirely within cavities 23 in the upper face of the plate 19 so as not to interfere with the oscillations of the casing 1. The elongated slots permit of a limited adjustment of the plate 19 forwardly and backwardly of the axle so as to be applicable to vehicles having different distances between the axle and cross steering rod. This adjustment and that afforded by the eccentric bushing upon the cross steering rod provide ample adjustments necessary in adapting the lock to different makes of vehicles. The cap screws by which the plate 19 and casing 1 are secured to the front axle, are accessible for removal only by first obtaining access to the interior of the casing 1 in order to remove the pivot screw 18, and then by the removal of the casing 1 to expose the heads of the screws 21.

The bar 3 reciprocates in an aperture 24, in one side portion of the rear end wall of the casing, and extends a considerable distance into the casing. A pawl 25 is pivoted intermediate of its ends to the bottom wall of the casing by a screw 26 and is provided with teeth 27 along one edge of and near one end of the pawl so as to be able to engage with locking notches 28 in the adjacent edge of the bar 3 when the rod is in a certain position and the pawl is free to move. A spring 29 which is held in place within the casing by a screw 30 and which is compressed between a wall of the casing and the pawl, exerts a continuous force upon the pawl tending to rotate the same so as to project its teeth 27 into a locking notches 28 and lock the rod against reciprocation in the casing. The pivot screw 26 is arranged beneath that edge of the bar 3 which is provided with the notches 28 so that when the teeth 27 are disposed within the notches 28, the direction of the force between the abutting edges of the teeth and notches, as attempts are made to reciprocate the bar 3, will pass through the axis of the screw 26 with the result that there will be no lever arms for the turning forces acting upon the pawl which might cause a rotation of the pawl with a disengagement of the pawl teeth and notches of the bar and consequent unlocking of the bar. The upper portion of the pawl 25 in the section through which the pivot screw 26 passes is cut away slightly so as to clear the edge of the bar 3, and the end of the pawl opposite from the locking teeth is also cut away upon its upper portion as at 31 for the same purpose. The bar 3 is guided within the casing by bearing blocks 32 and 33 along one side wall of the casing, and by a short block 34 adjacent the other edge of the bar. The bar is provided in its under face with a longitudinally extending slot 35 into which projects a guiding pin 36 carried by the bottom wall of the casing and serving as an additional guide for the bar. The tight fitting cover plate 37 of the casing 1 is secured in place by screws 38 and carries a depending strip 39 upon its lower face for bearing upon and guiding the bar 3. The cover plate 37 is also provided with a depending loop 40, through which the bar 3 passes whereby the cover is locked against removal when the bar 3 is within the casing, even when the securing screws 38 are removed.

The front end wall of the casing is provided with an aperture into which is threaded a lock 41, and a pin 42 passes through the casing wall and into the lock from within the casing so as to secure it against removal from the casing by unscrewing. While various types of locks may be employed I prefer a lock of the cylinder type which can be purchased in the open market and which has therein a rotatable cylinder operable by a key 43 which is received therein. The rotatable cylinder has upon the end which projects within the casing a cam member 44 which is concentric with an operating cam 45 rotatably carried by the inner end of the lock. The operating cam 45 is provided with pins 46 which are engaged alternately by the cam member 44 and shifted thereby. When the cylinder is rotated by a key 43, the cam member 44 will engage one of the pins 46 of the cam 45 and rotate the same about the axis of the cylinder and into or out of engagement with that end of the locking pawl 25 having no locking teeth. When the operating cam 45 engages the pawl 25, it rotates the same against the action of the spring 29 to shift the locking teeth 27 out of engagement with the notches 28 of the bar 3 and holds it in disengaged position so as to allow of free reciprocation of the bar within the casing. When the cam 45 is rotated out of engagement with the pawl 25, the spring 29 rotates the pawl to bring the teeth 27 thereof against the edge of the bar 3. When the bar 3 is shifted by an operation of the steering mechanism to bring the notches 28 into alignment with the teeth 27, the spring 29 will cause the teeth to enter the notches of the bar and lock it against further reciprocation.

The cam 45 will be locked in one operative position or the other whenever the key is removed from the cylinder. A grooved flange 47 may be provided upon the rear wall of the casing 1 and surrounding the aperture 24 for supporting a tubular rubber sleeve 48 shown in dotted lines in Fig. 2, through which the bar 3 may pass in order to prevent entrance of dust into the casing 1 through the aperture 24.

When the lock is to be applied to a vehicle, the pawl is operated through the medium of the key and the cam 45 to release the bar 3 and the latter is then withdrawn from the casing. The cover is then removed and the screw 18 taken out to permit of separation of the casing, plate 19, and clamping member 22. The U-shaped clamping member 22 is caused to embrace the front axle from the underside and the plate 19 is placed upon the upper face of the axle and secured to the ends of the member 22 by the cap screws 21. The collar sections 9 and 10 and the split bushing 17 are clamped to the cross steering rod 4 directly in the rear of the plate 19. The split bushing can be rotated within the collar sections and about the rod 4 until the bar 3 is brought to the necessary height before the clamping of the collar and bushing to the rod 4 by tightening of the screws 11 is completed. The plate 19 can be adjusted forwardly or rearwardly as permitted by the elongated slots 20, until it occupies a proper position with respect to the bar 3, and will then be clamped by tightening of the screws 21, after which the casing 1 will be attached to plate 19 by pivot screw 18. The bar 4 is next disconnected at one end from one of the steering knuckles and swung rearwardly sufficiently to permit insertion of the bar 3 into the casing through the aperture 24, with the cover plate of the casing in position, after which the rod 4 is reconnected to the steering knuckle. Before this insertion of the bar 3 into the casing however, it is of course necessary that the pawl 25 must have first been shifted to inoperative position by the cam 45 and lock key. The key can be removed and the vehicle driven and steered at will. As the cross steering rod moves in one direction or the other during the steering operation the bar 3 and casing 1 will turn about their pivots, and at the same time the bar 3 will reciprocate within the casing 1. When one desires to lock the vehicle, the operator turns the key 43 to shift the cam 45 out of engagement with the pawl 25 which permits movement of the latter under the influence of the spring 29 until the teeth 27 engage the edge of the bar 3, it being immaterial whether or not the teeth 27 at the moment engage in the notches 28, since as soon as any attempt is made to steer the vehicle, the bar 3 will be shifted to bring the notches into alignment with the teeth 27 whereupon the latter will spring into the notches and lock the bar 3 and the steering mechanism against further operation. The steering mechanism is locked when the bar 3 is locked because the bar is locked to the casing and the distance between the collar and casing must be varied during the steering operation. The bar 3 is preferably located at one side of the casing and the pivot of the casing upon the other side, that is, off set, so that any movement of the cross steering rod will always produce a reciprocation of the bar 3 within the casing. If the bar 3 passed centrally over the pivot of the casing, a considerable movement of the cross rod 4 in each direction from the normal forward driving position would be possible without producing any marked or appreciable reciprocation of the bar in the casing, so that a limited steering movement would be possible even if the locking of the bar were effective. By means of the preferred offset arrangement of the bar and casing pivot, any movement of the cross steering rod 4 produces a considerable reciprocating movement of the bar 3. The bar 3 covers the cavities 14 in the collar section 9 so that the screws 11 are inaccessible for loosening or removal by the thief. The cover plate cannot be removed, because the bar 3 passes through the depending loop 40 thereof, and the casing cannot be detached from plate 19 because the cover must be first removed before access can be had to the attaching pivot screw 18. The casing covers the plate 19 so that the screws 21 which provide the attachment to the axle are inaccessible for loosening, removal, or breakage by the thief. The notches 28 in the bar 3 are so positioned with respect to the teeth of the pawl that the cross steering rod will always be locked with the wheels making a slight angle to their normal straight forward running position so that the vehicle may be moved a desired short distance along the street before it runs into the curb, and thus the lock complies with the fire laws of different localities.

The material employed in the construction is a metal which can be hardened, preferably case hardened, so as to render destruction or disabling of the parts by a thief, extremely difficult, and entailing a considerable delay. Inasmuch as the removal of the key will lock the cam 45 either in or out of engagement with the pawl 25 to unlock or lock respectively the bar 3 from movement in the casing, there is no danger of the jarring of the cam 45 out of engagement with the pawl and the consequent locking of the steering mechanism without warning while the vehicle is being operated.

Case hardened spacers may be employed between the plate 19 and the ends of the arms of member 22 when necessary in order to apply the lock to axles considerably larger in height than those of the ordinary vehicle.

It is obvious that various changes in the details of construction herein described and illustrated may be made within the principle and scope of my invention.

I claim:

1. An automobile lock comprising a bar pivotally connected to the cross steering rod, a casing movably connected to the front axle by means accessible solely from the interior of the casing, and into which the bar projects and in which it is normally capable of sliding, a cover plate for the casing, said cover plate and bar having an interengagement to lock the cover plate to the casing when the bar is within the casing, and locking means within the casing and operable from the exterior thereof for securing the bar against movement in the casing.

2. An automobile lock comprising a bar pivotally connected to the cross steering rod, a casing pivotally attached to the front axle of the automobile into which the bar projects and in which it is normally capable of sliding, and means in the casing for locking the bar against sliding therein and thereby preventing movement of it and of the steering rod.

3. An automobile lock comprising a bar pivotally connected to the cross steering rod and provided with locking teeth, a pivoted casing attached to the front axle of the automobile into which the bar projects and in which it is normally capable of sliding, and a dog movable into and out of engagement with the locking teeth.

4. An automobile lock comprising a bar pivotally connected to the cross steering rod and provided with locking teeth, a pivoted casing attached to the front axle of the automobile into which the bar projects and in which it is normally capable of sliding, a dog movable into and out of engagement with the locking teeth, and key-operated means for moving the dog.

5. An automobile lock comprising a bar pivotally connected to the cross steering rod and provided with locking teeth, a casing pivotally attached to the front axle of the automobile into which the bar projects and in which it is normally capable of sliding, a dog movable into and out of engagement with the locking teeth, a spring pressing on the dog and tending to engage it with the teeth, and a key-operated cam movable to pivotally disengage the dog from the locking teeth.

6. An automobile lock comprising a sectional clamp secured to the cross steering rod by screws extending from the upper face thereof, a bar pivoted to the clamp and covering the screws, a casing pivotally connected to the front axle of an automobile and into which the bar projects and in which it is normally capable of sliding, and means for locking the bar against movement in the casing.

7. An automobile lock comprising a bar pivotally connected to the cross steering rod, a casing movably connected to the front axle and into which the bar projects and in which it is normally capable of sliding, a covering plate for the casing provided with a loop extending into the casing and receiving the bar when within the casing and means for locking the bar against movement within the casing.

8. An automobile lock comprising a bar pivotally connected to the cross steering rod, a casing secured to the front axle by means including a pivot extending from the interior of the casing and in which the bar is normally capable of sliding, a covering plate for the casing provided with a loop extending into the casing and receiving the bar, and means for locking the bar against movement within the casing.

9. A lock for vehicles having two substantially parallel relatively moving parts and comprising a bar pivoted to one of said parts, a casing pivoted to the other of said parts, the free end of the bar being reciprocatingly received within the casing and having locking notches along one edge of the portion within the casing, a pawl pivoted to the casing and having locking teeth for engagement with the notches when the notches move into alignment with the teeth, the line of the notches intersecting the axis of the pawl pivot, whereby the direction of the force between the notches and teeth passes through the axis of the pivot, means normally tending to rotate the pawl to locking position, and key controlled means accessible for operation from the exterior of the casing, for shifting said pawl to ineffective position.

10. A lock for vehicles having two substantially paralled relatively moving parts and comprising a bar pivoted to one of said parts, a casing pivoted to the other of said parts, the free end of the bar being reciprocatingly received within the casing, a pawl pivoted to the casing and engaging with the bar to lock the same against reciprocation in the casing, the direction of the force between the pawl and bar, when the bar is locked, passing through the axis of the pivot of the pawl, means tending constantly to rotate the pawl into locking engagement with the bar, a rotatable cam for shifting the pawl against the action of its rotating means and out of locking engagement with the bar, and means for rotating the cam and locking it in effective and ineffective positions.

11. A lock for vehicles having two substantially parallel relatively moving parts and comprising a bar pivoted to one of the said parts, a casing having a removable cover pivoted to the other of said parts, the free end of the bar projecting into and reciprocating in said casing, a loop depending from the cover and through which the bar passes when in said casing to lock the cover against removal, means within the casing and operable from the exterior thereof for locking at will the bar against reciprocation in the casing or removal therefrom.

12. A lock for vehicles having two substantially parallel relatively moving parts and comprising a bar pivoted to one of said parts, a casing pivoted to the other of said parts, the free end of the bar being reciprocatingly received within the casing, a rubber tubular sleeve carried by the casing and surrounding the bar for preventing entrance of dust into said casing, and manually controlled means within the casing for locking the bar against reciprocation therein.

13. A lock for vehicles having a front axle and a cross steering rod and comprising a split collar, a split bushing rotatable in said collar and having a longitudinally extending eccentrically disposed aperture through which the cross steering rod passes, means for clamping the collar and bushing to the cross steering rod, a bar pivoted to the collar, a casing pivoted to the front axle and receiving the bar for reciprocation therein, and means for locking the bar against reciprocation in the casing.

14. A lock for vehicles having a front axle and a cross steering rod and comprising a split collar, a split bushing rotatable in said collar and having a longitudinally extending eccentrically disposed aperture through which the cross steering rod passes, said collar and bushing having co-operating means for preventing endwise displacement of one with respect to the other, means for clamping the collar and bushing to the cross steering rod, a bar pivoted to the collar, a casing pivoted to the front axle and receiving the bar for reciprocation therein, and means for at will locking the bar against reciprocation in the casing.

15. A lock for vehicles having a front axle and a cross steering rod and comprising a split clamping device including screws for varying the effectiveness of the clamp, said device being clamped to the cross steering rod and having the heads of the screw disposed within cavities in the upper face of the device, a bar, a pivot bolt for pivotally connecting the bar to the upper face of the device and having a round head countersunk into the bar and also having its nut disposed in a cavity within and accessible only from the inside of the device, said bar covering the cavities in the upper face of the device when disposed substantially transversely of the cross rod, and exposing the cavities when disposed parallel with the rod, a casing in which the free end of the bar reciprocates pivoted to the front axle, and means for locking the bar against reciprocation in or removal from the casing.

16. A lock for vehicles having a front axle and a cross steering rod, and comprising a split clamping device including screws for varying the effectiveness of the clamp, said device being clamped to the cross steering rod, and having the heads of the screws disposed within cavities, in the upper face of the device, a bar, a pivot bolt for pivotally connecting the bar to the upper face of the device and having a round head countersunk into the bar and also having its nut disposed in a cavity accessible only from the inside of the device, said bar covering the cavities in the upper face of the device when disposed substantially transversely of the cross rod, and exposing the cavities when disposed parallel with the rod, a casing, a removable cover for said casing having a loop depending into the casing, the free end of the bar entering and reciprocating in said casing and also passing through the depending loop to lock the cover to the casing, a bearing plate, means for clamping the plate to the front axle for limited adjustment of the plate forwardly and rearwardly thereof and accessible for removal only from the upper face of the plate, means for attaching the casing to the upper face of the plate for pivotal movement thereon and to prevent access to the plate clamping means. said casing attaching means being accessible for removal only from the interior of the casing, and means within the casing and operable from the exterior thereof for locking the bar against reciprocation in the casing.

17. A lock for vehicles having a front axle and a cross steering rod and comprising a bar, means for pivotally securing the bar to the cross steering rod and including a rotatable eccentric bushing for elevating and lowering the bar to a limited extent, a plate, means for securing the plate to the front axle and for adjustment forwardly and rearwardly thereof, a casing into which the free end of the bar reciprocatingly projects, means for pivotally securing the casing to the plate and through it to the front axle, and manually controlled means for locking the bar against reciprocation in the casing and thereby prevent relative movement between the axle and cross steering rod.

18. A lock for vehicles having a front axle and a cross steering rod and comprising a split collar, a split bushing rotatably carried within the collar and having an eccentrically disposed longitudinally extending aperture for receiving the cross steering rod, means for clamping the collar sections together and the bushing to the cross rod, a bar pivoted to the split collar and extending forwardly, and locking means pivotally carried by the front axle for receiving and securing the bar.

19. A lock for vehicles having a front axle and a cross steering rod, a bar, means for pivotally securing the bar to the cross steering rod and adjustable to move the bar to different heights, a casing into which the bar projects and in which it reciprocates, means for pivotally securing the casing to the front axle and for adjusting the casing forwardly and rearwardly thereon, and manually controlled means for locking the bar against reciprocation in the casing.

20. A lock for vehicles having a front axle and a cross steering rod, a bar, means for pivotally securing the bar to the cross steering rod, a plate, means for securing the plate to the front axle for adjustment forwardly and rearwardly, a casing into which the free end of the bar projects and in which it reciprocates, means for pivotally securing the casing to the plate, and manually controlled means for locking the bar against reciprocation in the casing.

21. A lock for vehicles having a front axle, and a cross steering rod, a bar, means for pivotally securing the bar to the cross steering rod, a U-shaped member embracing the front axle along the sides and lower face and having threaded openings in its upper face, a plate extending across the upper face of the axle and having parallel elongated slots therein and also having cavities in the upper face thereof leading to each slot, cap screws passing through the slots in the plate and threaded into the threaded openings with the heads of the screws entirely within the cavities in the plate whereby the plate is clamped to the axle and is adjustable forwardly and rearwardly thereof, a casing pivoted to said plate and covering its cavities, said bar projecting into and reciprocating in said casing, and manually controlled means within the casing for locking the bar against reciprocation therein.

22. A lock for vehicles having a front axle and a cross steering rod, a bar, means for pivotally securing the bar to the cross steering rod, a U-shaped member embracing the front axle along the sides and lower face and having threaded openings in its upper face, a plate extending across the upper face of the axle, cap screws having their heads countersunk in the upper face of the plate, passing through the plate and threaded into the threaded openings of the U-shaped member, a casing into which the free end of the bar projects and in which it reciprocates, a screw passing through the bottom of the casing and threaded into the plate for pivotally securing the casing thereto so as to conceal the countersunk cap screws, a cover for the casing having a loop depending into the casing and through which the bar passes when in the casing to lock the cover to the casing, and locking means in said casing and operable from the exterior thereof for locking the bar against reciprocation in or removal from the casing.

23. A lock for vehicles having a front axle and a cross steering rod, a bar, means for pivotally securing the bar to the cross steering rod, a U-shaped member embracing the front axle along the sides and lower face and having threaded openings in its upper face, a plate extending across the upper face of the axle, cap screws, having their heads countersunk in the upper face of the plate, passing through the plate and threaded into the threaded openings of the U-shaped member, a casing into which the free end of the bar projects and in which it reciprocates, a screw passing through the bottom of the casing and threaded into the plate for pivotally securing the casing thereto so as to conceal the countersunk cap screws, a cover for the casing having a loop depending into the casing and through which the bar passes when in the casing to lock the cover to the casing, means within said casing for securing the bar against reciprocation in or removal from the casing, and a key controlled lock carried in a wall of the casing and operable upon the said means within the casing for rendering it effective or ineffective in securing the bar against reciprocation in or removal from the casing.

24. A lock for vehicles having a front axle and a cross steering rod, a bar, clamping sections between which the rod passes, screws passing through and countersunk in one section and threaded into the other section, means for pivotally securing the bar to the first mentioned section and accessible for removal only when the sections are completely separated, the bar extending over and concealing the countersunk screws when disposed in a direction toward the axle, a casing pivoted to the front axle, and in which the bar reciprocates, and means for locking the bar against reciprocation in the casing.

25. A lock for vehicles having a front axle and a cross steering rod, a bar pivoted to said cross rod, a two section clamp embracing the front axle, means for securing the sections together and secure the same to the axle, said means being accessible for removal from one face of one of the sections, a casing, means for securing the casing to said one section for pivotal movement thereon and to conceal the sections securing means, said casing securing means being accessible for removal only from the interior of the casing, a cover for the casing, said bar extending into said casing for reciprocation therein, said bar and cover having interrelated means whereby the cover is locked to the casing when the bar is within the casing, and means controlled from the exterior of the casing for locking the bar against reciprocation in or removal from the casing.

26. An automobile lock comprising a connection between the cross steering rod of an automobile and the front axle thereof, the connection being pivotally attached to the parts in a manner normally to move with the rod and slide endwise and rotate with respect to the axle, and means for locking the connection against sliding movement on the axle and thereby preventing movement of the rod.

In witness whereof, I hereunto subscribe my signature.

ERNEST SIEGEL.